(12) United States Patent
Maw et al.

(10) Patent No.: US 7,506,215 B1
(45) Date of Patent: Mar. 17, 2009

(54) METHOD FOR HEALTH MONITORING WITH PREDICTIVE HEALTH SERVICE IN A MULTIPROCESSOR SYSTEM

(75) Inventors: Patricia Lynn Maw, Rancho Santa Margarita, CA (US); Lyle Owen Jevons, Jr., Mission Viejo, CA (US); Matthew Munson, Tustin, CA (US); Justin Azriel Okun, Lake Forest, CA (US); Thomas Adrian Valverde, Ladera Ranch, CA (US)

(73) Assignee: Unisys Corporation, Blue Bell, PA (US)

( * ) Notice: Subject to any disclaimer, the term of this patent is extended or adjusted under 35 U.S.C. 154(b) by 1085 days.

(21) Appl. No.: 10/731,045

(22) Filed: Dec. 9, 2003

(51) Int. Cl.
  *G06F 11/00* (2006.01)
(52) U.S. Cl. .................. 714/47; 714/26; 709/224
(58) Field of Classification Search ............. 714/47, 714/26
  See application file for complete search history.

(56) References Cited

U.S. PATENT DOCUMENTS

| | | | |
|---|---|---|---|
| 4,881,230 A | 11/1989 | Clark et al. | |
| 6,023,507 A | 2/2000 | Wookey | |
| 6,154,128 A | 11/2000 | Wookey et al. | |
| 6,182,249 B1 * | 1/2001 | Wookey et al. | 714/47 |
| 6,237,114 B1 | 5/2001 | Wookey et al. | |
| 6,263,452 B1 | 7/2001 | Jewett et al. | |
| 6,550,017 B1 * | 4/2003 | Moiin et al. | 714/4 |
| 6,738,811 B1 * | 5/2004 | Liang | 709/224 |
| 6,754,664 B1 * | 6/2004 | Bush | 707/102 |
| 7,007,084 B1 * | 2/2006 | Chakravarti et al. | 709/224 |
| 7,069,480 B1 * | 6/2006 | Lovy et al. | 714/57 |
| 2002/0113816 A1 * | 8/2002 | Mitchell et al. | 345/734 |
| 2003/0204588 A1 * | 10/2003 | Peebles et al. | 709/224 |
| 2003/0212928 A1 * | 11/2003 | Srivastava et al. | 714/47 |
| 2004/0044929 A1 * | 3/2004 | Chujo | 714/47 |

OTHER PUBLICATIONS http://en.wikipedia.org/wiki/.NETFramework.*

* cited by examiner

*Primary Examiner*—Yolanda L Wilson
(74) *Attorney, Agent, or Firm*—Alfred W. Kozak; Robert P. Marley

(57) ABSTRACT

An embodiment of the present invention is a method for monitoring various data sources for events indicative of a current or potential system health problem, thereby automating management of system health monitoring, prediction, and notification, and providing the ability to correct said system health issues in the environment of a multiprocessor system.

1 Claim, 8 Drawing Sheets

Server Director Operator Console on \\usmv-hatfiepl3\QDB(hatfiepl)

File  View  TreeView  List  Graph  KS  Extensions  Window  Help

Master
  USMV-HATFIEPL3
CPU
  0
Memory
File System
Network
Group Policies
Unisys Server:USMV-HATFIEPL3
  NICs
  1
  2
  Contrast Manager
  Process Manager
  Predictive Alerts CpuByProcess    PhysicalDiskBusy    ServiceDo
CpuLoaded    PhysicalDiskIO    ServiceHu
CpuResource    PhysicalDiskQLen    ServiceRe
DNSConnectivity    PortHealth    SharedFiles
FailedLogon    PrinterQueue    SystemUp
FileChanged    ProcessDown    TopCpuPro
FilesOpen    Processes    TopMemory
LogicalDiskBusy    Processup    TrustRelatio
LogicalDiskIO    RegistryChange
LogicalDiskSpace    RemoteServiceDown
MemUtil    RunAwayProcesses

| Job | Status | Children | Computer | Knowledge Script | User |
|---|---|---|---|---|---|
| 263 | Stopped | 1 | USMV-HATFIEPL3 | WinBasic_CpuLoaded | NA\HatfiePL |
| 257 | Stopped | 1 | USMV-HATFIEPL3 | Unisys_ServerAlerts | NA\HatfiePL |
| 255 | Stopped | 1 | USMV-HATFIEPL3 | Unisys_PredictiveAlerts | NA\HatfiePL |

*Fig. 8*

METHOD FOR HEALTH MONITORING WITH PREDICTIVE HEALTH SERVICE IN A MULTIPROCESSOR SYSTEM

CROSS-REFERENCES TO RELATED CASES

This application is related to a co-pending application U.S. Ser. No. 09/658,959 entitled "Automatic Fault Management System Utilizing Electronic Service. Requests", and has since issued as U.S. Pat. No. 6,654,915 on Nov. 25, 2003 which is incorporated herein by reference.

This application is related to a co-pending application U.S. Ser. No. 09/731,504 entitled "Electronic Service Requests Generator For Automatic Fault Management System", and has since issued as U.S. Pat. No. 6,718,439 on Apr. 6, 2004 which is incorporated herein by reference.

BACKGROUND OF THE INVENTION

1. Field of the Invention

The present invention generally relates to a utility service that automates management of system health-operations in monitoring, prediction, and notification, and provides the ability to correct system health issues in a digital environment.

2. Description of Related Art

Monitoring the health of complex multi-processor systems is a difficult and time-consuming task. Human operators must know where and how frequently to check for problem conditions and how to react to correct them when found. Recognizing the signs of a possible future problem so that it can be avoided altogether is even more difficult and is not a task that is performed with any consistency across customer sites. Earlier releases of the Unisys Server Sentinel software suite attempted to address these issues for Unisys ES7000 systems through a set of approximately 20 knowledge scripts provided with the Server Director product. Although these scripts provided automated monitoring for predetermined alert conditions, each script had to be separately configured and deployed by technical staff at each customer site. The conditions being monitored were generally only things that could be expressed very simply (such as simple threshold violations), and the script set provided little in the way of predictive monitoring.

On related art method to which the method of the present invention generally relates is described in U.S. Pat. No. 4,881,230 entitled "Expert System For Processing Errors In A Multiplex Communications System". This prior related art method is a method and apparatus for detecting and analyzing errors in a communications system. The method employs expert system techniques to isolate failures to specific field replaceable units and provide detailed messages to guide an operator to a solution. The expert system techniques include detailed decision trees designed for each resource in the system. The decision trees also filter extraneous sources of errors from affecting the error analysis results.

The present invention differs from the above related cited art in that the prior invention deals specifically with a "communications system", not a general-purpose computer system. The cited prior reference targets actual failures of field replaceable hardware units, whereas the present invention will detect warning conditions that predict failure (as well as failures that have already occurred) and is capable of monitoring software as well as hardware.

Yet another related art method to which the method of the present invention generally relates is described in U.S. Pat. No. 6,263,452 entitled "Fault-tolerant Computer System With Online Recovery And Reintegration Of Redundant Components". This prior related art method involves a computer system in a fault-tolerant configuration which employs multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The faulty unit can be replaced and reintegrated into the system without shutdown. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references via the separate CPU-to-memory busses are voted at the three separate ports of each of the memory modules. I/O functions are implemented using two identical I/O busses, each of which is separately coupled to only one of the memory modules. A number of I/O processors are coupled to both I/O busses. I/O devices are accessed through a pair of identical (redundant) I/O processors, but only one is designated to actively control a given device; in case of failure of one I/O processor, however, an I/O device can be accessed by the other one without system shutdown.

The present invention differs from this related art in that the cited prior art focuses on a method that deals with fault-tolerant configuration of redundant CPUs. The method of the present invention is not limited to hardware and is concerned with reporting hardware and software problems rather than automatically swapping out bad hardware components.

Another related art method to which the method of the present invention generally relates is described in U.S. Pat. No. 6,237,114 entitled "System And Method For Evaluating Monitored Computer Systems". This prior related art method is a computer system used in monitoring another computer system and provides both textual resolution information describing a likely solution for a problem encountered in the monitored computer system as well as component information that relates to the particular problem. The component information includes the various hardware, software and operating conditions found in the monitored computer system. The monitoring computer system determines if a condition of a predetermined severity exists in the monitored computer system according to diagnostic information provided from the monitored computer system. The diagnostic information is represented in the monitoring computer system as a hierarchical representation of the monitored computer system. The hierarchical representation provides present state information indicating the state of hardware and software components and operating conditions of the monitored computer system. The resolution information relating to the condition is retrieved from a resolution database and relevant component information is retrieved from the hierarchical representation of the computer system and presented to a support engineer to assist them in diagnosing the problem in the monitored computer system.

The present invention differs from this related art in that the cited prior art focuses on a system for describing a problem found on a monitored system and advises the user of possible resolutions. The method of the present invention does not attempt to advise the user as it is more concerned with detecting and reporting failures and bad data trends that may indicate potential future failures. Many of these conditions are self-explanatory. This cited art seems to appear like this is a distributed application and the monitoring system is responsible for determining if a problem condition is present. However, in the present invention, all monitoring is performed locally and is tailored to use only a set of special monitoring policies that apply to the local system.

BRIEF SUMMARY OF THE INVENTION

It is therefore a method of the present invention to provide in a multiprocessor system, the ability to monitor and respond to a flexible set of conditions; adding and removing conditions as needed; the ability to provide an estimated time to failure for certain conditions; the ability to collect violated conditions for processing by a separate script or program. Those features provided by the service are shown in exemplary form to operate in the Windows .NET environment. Features provided by the HealthEvents.dll (data link library) can be used from any COM (Component Object Model)-capable scripting or programming language running in a Windows NT-like environment (NT, Windows 2000, Windows XP, Windows .NET). A Server Director script, as written, functions only in the Unisys Server Director or NetIQ AppManager environment, but can be modified to work in any Windows scripting environment.

The method of the HealthMonitor Service loads up the HealthEvents Data Link Library so that the client can create a RealthEvents Object or a PredictiveEvents Object. This "Local Object" (the RealthEvents or PredictiveEvents object created in the client's local programming environment) is connected to a Collection of Global RealthEvents or PredictiveEvents after which there is a return of individual Violation Events to the client.

At start up, the PredictiveEvents and HealthEvents Collections are processed against a set of pre-determined policies (P), which determines what to monitor, how often to monitor, and what action to take if a policy is violated. Queries are made to check if the selected policy (P) does monitoring of long-term trends which may involve a Violation Event. Likewise this is done for Predictive Data also.

Each Provider (a source of Health Monitoring data, such as a Windows Event Log) is checked to see if it is currently available. Then the Provider is checked against any policy P applicable to that Provider with the final result of returning information about any policy violation by the selected provider. Then corrective action can be instituted by the HealthMonitor service and HealthEvents objects via the User Client Application or script of item 712 of FIG. 7.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 8 is a representation of the Unisys Server Director Operator Console, which shows the "Predictive Alerts" icon flashed by the HealthMonitor utility in the leftmost ("tree view") pane and shows the Unisys_ServerAlerts and Unisys_PredictiveAlerts scripts in the lowermost ("jobs") pane.

GLOSSARY ITEMS

Figure 1:
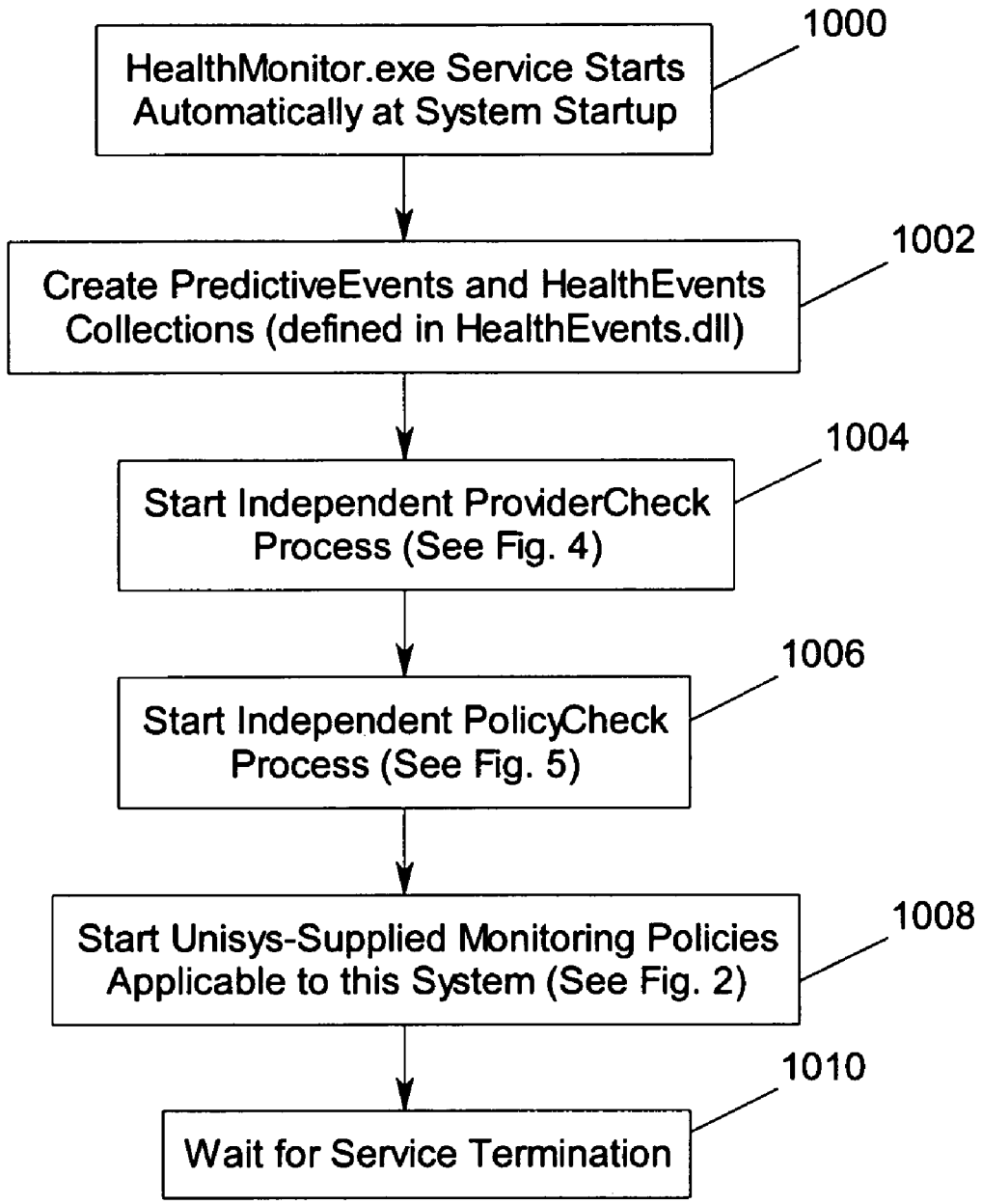
FIG. 1 is a flowchart which illustrates the general process of the HealthMonitor utility.

1. Unisys Server Director: a component of the Sentinel Software suite that facilitates management of the platform and operating environment using a drag-and-drop user interface to deploy any of a number of ready-to-use Server Director scripts. Server Director is based on the NetIQ AppManager product.
2. Server Director Scripts: scripts deployed using the Server Director product that monitor and report or monitor and react to various conditions in the platform or operating environment. The scripts are written in a variant of extended Basic for scripting that is recognized by the script interpreter code Unisys has licensed from NetIQ.
3. Server Sentinel: A suite of software tools sold with Unisys ES7000 servers to provide platform management capabilities.
4. Unisys ES 7000: large-scale Unisys enterprise server system that supports up to 32 processors running the Windows operating system.
5. Script: A set of instructions that automate the operation of an application or utility.
6. Threshold Violations: conditions in which a monitored metric on a system exceeds a predefined level. For instance, if the threshold level for the CPU utilization metric has been set at 90%, values of that metric above 90% would be threshold violations.
7. Predictive Monitoring: monitoring of system metrics for conditions that indicate a potential future problem rather than a current failure. For example, a decreasing trend in the amount of available disk space indicates that the system may become unusable in the future if the trend continues.
8. GUI (Graphical User Interface): system interface that uses pictures, graphs, or other displays in addition to text to convey information to the user.
9. Unisys HealthEvents COM Object: A COM object that supports methods and properties describing a single health violation.
10. Health Issues: problems or potential problems with the operation or availability of the system.
11. Health Events: Health issues detected by the Unisys HealthMonitor service. See "Health Issues".
12. Health Violations: see "Health Events".
13. Non-Predictive Alerts: alerts that pertain to an actual current problem rather than a predicted future problem. For example, an alert indicating a decreasing trend in the available disk space predicts a possible future problem;

an alert that indicates that there is no disk space left is a non-predictive alert because the problem has actually occurred.

14. Windows .NET Environment: processing environment maintained by the Windows .NET operating system.
15. XML: eXtensible Markup Language that allows for Web automation and data interchange across multiple platforms and applications.
16. XML Statements: statements written in the XML language.
17. Scriptable Interface: a set of methods and properties on a COM object that are exposed for access from scripting languages.
18. Health (of a complex multiprocessor system): Involves the usability and availability of the system.
19. Knowledge Scripts: The NetIQ name for scripts executed by their AppManager product. See "Server Director Scripts".
20. Health Monitoring (multiprocessor system): Monitoring of system metrics to determine the usability and availability of the system.
21. Canned XML: predefined set of statements written in XML. These statements cannot be altered by the user.
22. HealthEvents COM Object: see "Unisys RealthEvents COM Object"
23. Health Events Object: see "Unisys HealthEvents COM Object"
24. Server Director Tree View: user interface display for the Server Director or AppManager product.
25. Local System: system where a program has been started, in particular a system where the HealthMonitor service and the HealthEvents dll are installed and running.
26. Monitoring Policies: conditions describing metrics for system health. For example, a monitoring policy for CPU utilization might say that: the system is healthy as long as CPU usage is 90% or less.
27. .dll file: dynamic link library file, one of a collection of small programs, any of which can be called when needed by a larger program that is running in the computer.
28. .NET: Windows .NET operating system.
29. COM-capable Scripting or Programming Language: any programming language that understands the COM (Component Object Model) standard.
30. NetIQ AppManager: product of NetIQ Corporation that provides system monitoring and problem reporting using a suite of scripts.
31. Scriptable Data Collection: a collection of data items that is accessible via scripting.
32. HealthEvents dll: dynamic link library file containing the methods and properties supported by the HealthEvents and PredictiveEvents COM objects.
33. PredictiveEvents: A CON object that supports methods and properties describing a single predictive health violation.
34. HealthEvents dll file: see "HealthEvents dll".
35. Policy Check Process: processing thread whose purpose is to determine the current valid set of monitoring policies for this system. This thread is started by the main processing thread of the HealthMonitor service.
36. Provider X: a particular source of health monitoring data. Examples of "providers" are the Windows event_logs and Windows performance counters.
37. Policy Y: a particular health monitoring policy. Examples of such policies are monitoring: that CPU utilization is below 90%, or that a given disk drive has at least 10% available space.
38. Server Sentinel Environment: Set of proprietary software processes that are installed and run on Unisys ES7000 servers.
39. Component Object Model (COM) Standard: Microsoft architecture for component interoperability that is not dependent on any particular programming language, is available on multiple platforms, and is extensible. See the white paper at http://msdn.microsoft.com/library/default.asp?url=/library/en-us/dncomg/html/msdn_comppr.asp for a technical overview.
40. COM Object: A component written to the COM standard that provides interfaces which can be invoked by applications.
41. Long Term Trend: A collection of data points that trend in the same direction (increasing or decreasing) over time.
42. Current Data Point: Value of a monitored system health indicator at this moment in time.
43. Saved Trend Data: Collection of data points saved in a file over time; these data points can be analyzed to determine if they constitute a trend.
44. Predictive Data: Monitored system health indicator that can be used to predict a potential future problem, for example the amount of available disk space remaining.
45. PredictiveEvents Collection: A collection of PredictiveEvents objects.
46. Local Object: An instance of a COM object created by a client program in its local programming environment.
47. Global HealthEvents: The system-wide collection of HealthEvents objects maintained by the HealthMonitor service. Client programs obtain a local copy of this global collection for use in their programming environment. There is also a global PredictiveEvents collection.
48. HealthEvents Object: See "Unisys HealthEvents COM Object".
49. Unisys-Supplied Policy File: A file of predefined XML statements describing health monitoring policies that is included with the HealthMonitor service. See "Canned XML". (Glossary #21)
50. Thread: A sequence of instructions from a single Windows application that execute independently of the parent process; in this case, the HealthMonitor service spawns off separate threads to monitor for policy and provider changes independently of the main processing flow in the HealthMonitor service.

General Overview:

The Unisys HealthMonitor service automates management of system health monitoring, prediction, and notification, and provides the ability to correct system health issues in the Server Sentinel environment.

The exemplary Windows .NET service portion of the solution involved herein does the following:

(a) executes the health monitoring policy for the system, which is expressed in the form of an inbuilt sequence of XML statements describing conditions to monitor for and responses to take when those conditions are encountered. The flexibility of XML allows complex monitoring conditions to be expressed.

(b) runs automatically at system startup; no configuration or other user intervention is required.

(c) monitors only the subset of conditions described in the canned XML that is applicable to the current system configuration; conditions involving items of hardware or software not present on the system are not activated unless/until those items become present, and items that are removed after the service commences will cease to be monitored when the service notices their absence.

(d) includes a trend analysis module that uses the data from several of the monitored metrics to calculate the length of time to a potential future failure; these long-term trend warnings and other warnings based on shorter-term data provide a degree of "predictive" warning of potential problems that was previously absent.

(e) collects information about the normal state of the system as reported by several metrics; this information can be used by a future release of the service to improve the monitoring policy on the fly.

The monitoring service uses a set of interfaces implemented in the Unisys HealthEvents COM object to capture information about health violations and predicted violations on the system. The HealthEvents object maintains the collection of violation events and exports a scriptable interface that can be used to retrieve one or more of the events for display or further processing by some other application running on the system. In this particular implementation, the Server Director retrieves and processes the saved events.

The final piece of the solution involves two new knowledge scripts (712) that run in the Server Director (an application in the Unisys Server 702). The scripts provide notification of health events as they are detected in an environment and a form that is already familiar to existing Server Sentinel customers. These scripts retrieve the server (non-predictive) alerts and predictive alerts from the event collections maintained by the HealthEvents object and flash the associated icon in the Server Director tree view to direct the end user to the site of the problem. (Predictive alerts will flash both the icon for the affected system component and the "Predictive Alerts" icon, server alerts will flash on the icon of the affected component seen in FIG. 8.) Server Director also provides a rich set of additional corrective and notification actions that can be associated with either or both scripts, as the user desires.

DETAILED DESCRIPTION

The general purpose of the software methodology described herein is to monitor the health of multi-processor systems, and appropriately respond to a current or potential system health problem, thereby putting a package of data describing the event into a scriptable data collection that is accessed by a script running in a separate process of the system, called Server Director. This Server Director monitors multiple systems using a script-driven approach and has a GUI (Graphical User Interface) that displays information about the systems it monitors.

Figure 7:
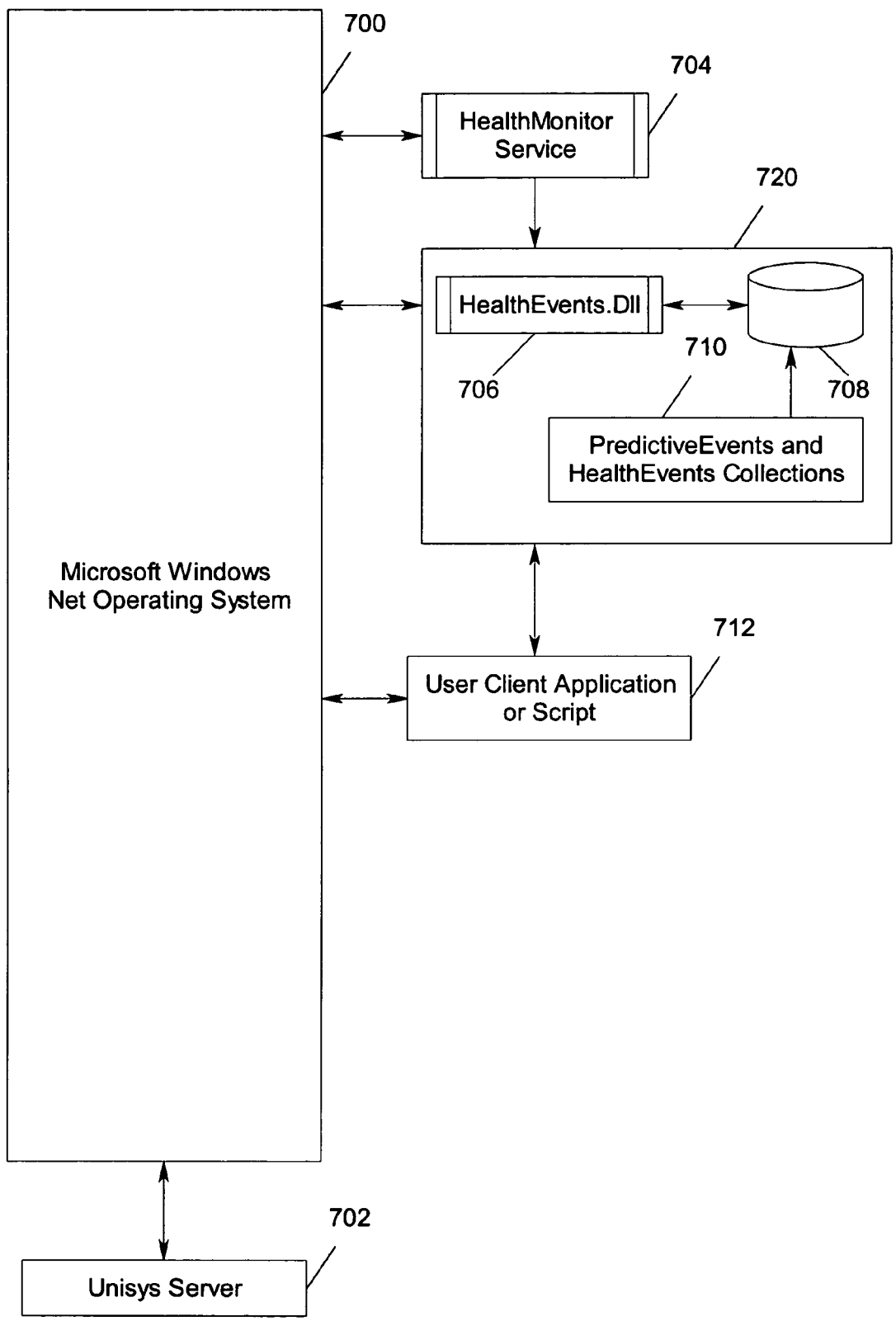
FIG. 7 shows an overall block diagram in which the method of present invention is used.

FIG. 7 illustrates a generalized block diagram in which the method of the present invention could be used. A Microsoft Windows .NET operating system exists (700), which communicates data to and from a Unisys server 702. A series of processes are included in Service Module 720, which include a HealthEvents.dll file (706), which communicates with a data store 708. The data store 708 contains the PredictiveEvents and HealthEvents collections 710. The data in these collections is accessed through the HealthEvents.dll (706) hosted by the Microsoft Windows .NET operating system 700. This series of process and data in Service Module (720) receive their input from the HealthMonitor service 704. A user client application or script 712, also hosted by the Microsoft Windows .NET operating system 700, maintains communication with the set of processes in Service Module 720 as well.

FIG. 1 is a flowchart that illustrates the process flow of the HealthMonitor program. The executable file for the HealthMonitor starts automatically once the system has been started (Block 1000). PredictiveEvents and HealthEvents collections are created at step 1002. It should be noted that these events are defined in the HealthEvents.dll file 706. The independent ProviderCheck process is then initiated (Block 1004), which is described further in FIG. 4. The independent PolicyCheck process is initiated next (block 1006). The process is illustrated in further detail in FIG. 5. Next, the Unisys Engineering-supplied monitoring policies that are applicable to this system are started (Block 1008). This step is discussed further in FIG. 2. Next, a state in which service termination is waiting is initiated at step 1010.

Figure 2:
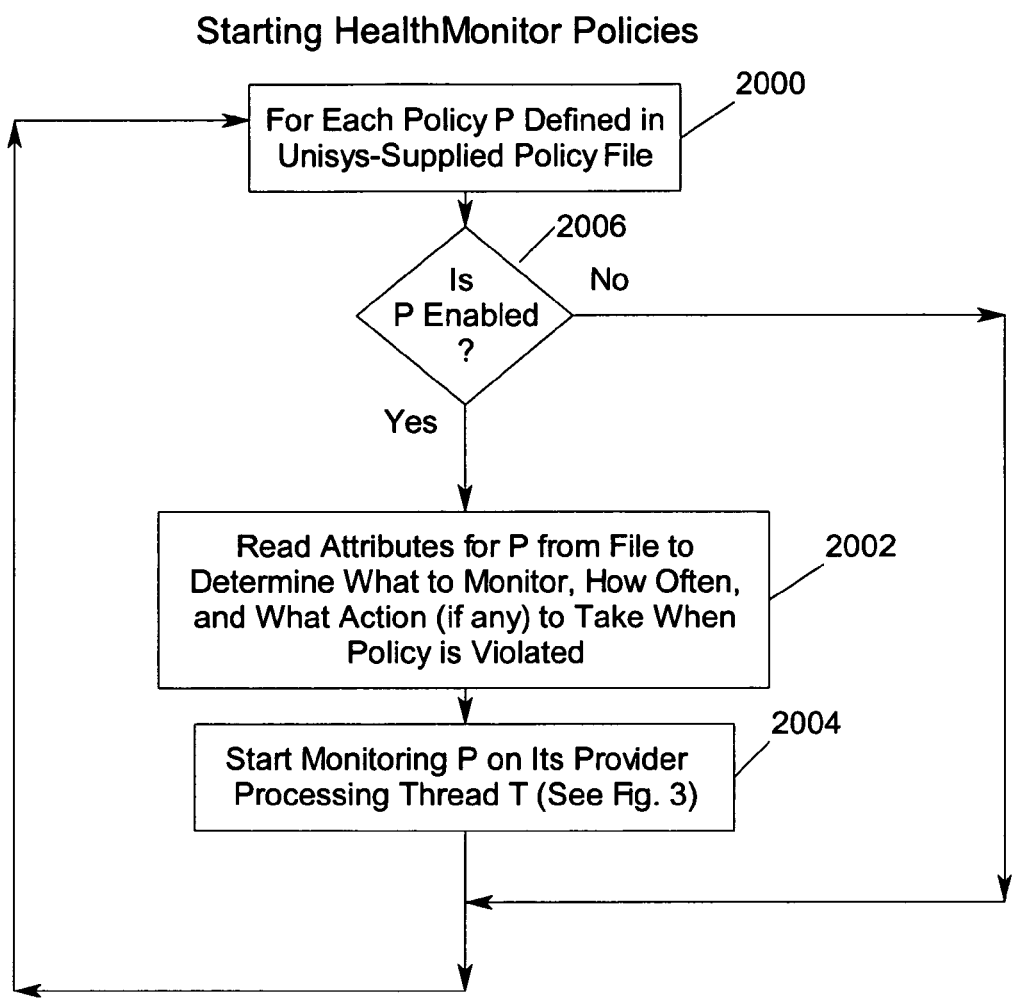
FIG. 2 is a flowchart which illustrates the process for starting HealthMonitor policies.

FIG. 2 is a flowchart that illustrates the start of HealthMonitor policies. The process begins by looking at each policy "P" defined in a Unisys-supplied policy file (Block 2000). An inquiry is made at step 2006 to check P is enabled? If P is not enabled (NO to inquiry 2006), the process returns to check the remaining policies P defined in the Unisys-Supplied Policy file back at step 2000. If the answer to inquiry 2006 is YES, and P is enabled, then for each of these policies defined, the attributes for P are read from the file to determine what to monitor, how often, and what action, if any, to take when the policy is violated (Block 2002). For example, one policy monitors the CPU utilization of a processor every 20 seconds and writes a warning message to the event log if the utilization exceeds 90%. Monitoring on P then begins on a separate processing thread T (Block 2004) initiated by the HealthMonitor service. This process can be seen in more detail in FIG. 3. The process then continues to loop back to step 2000, where the remaining policies P defined in the policy file are checked to see if they should be deployed on this system.

Figure 3:
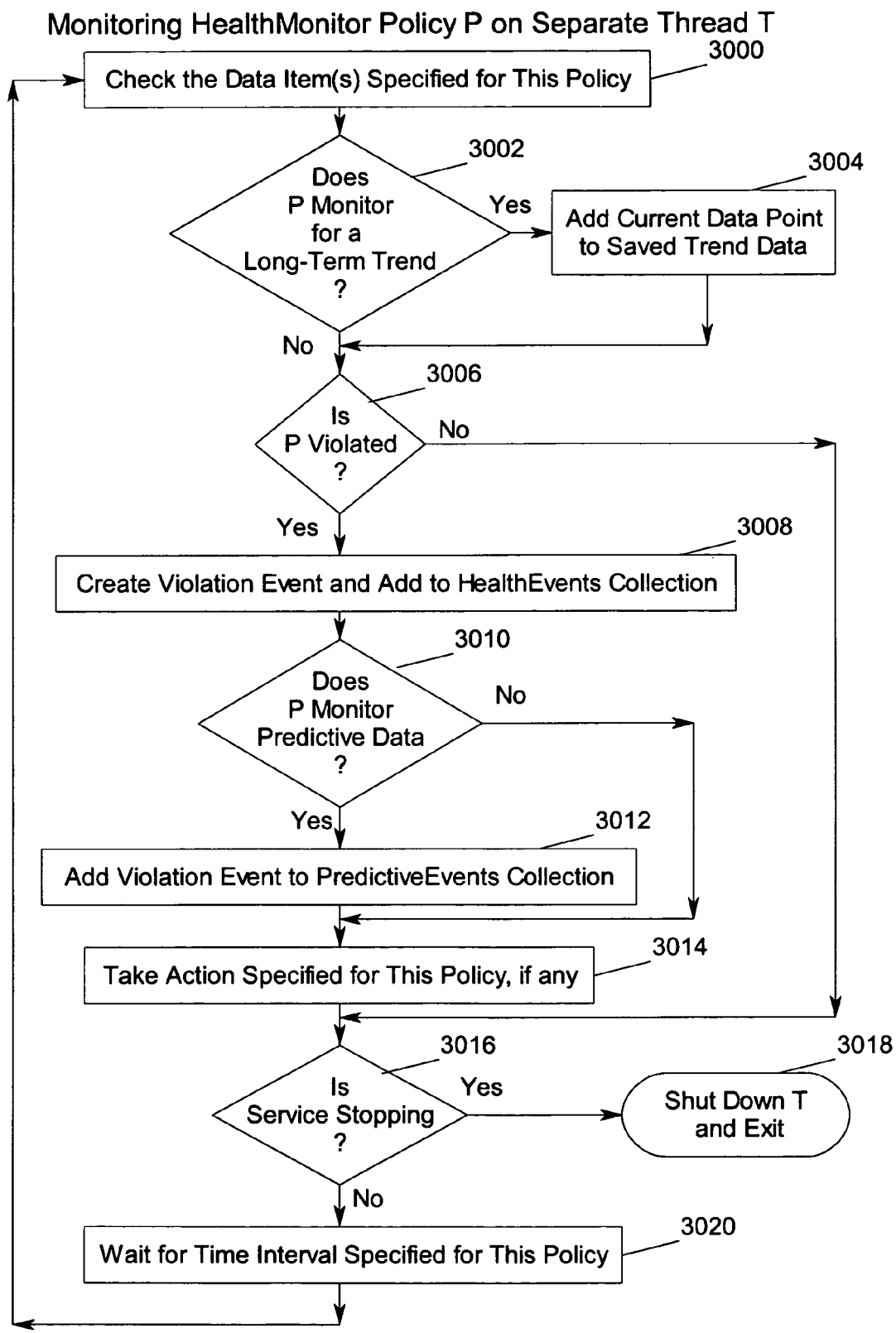
FIG. 3 is a flowchart illustrating a process which monitors the HealthMonitor policy on a separate thread.

FIG. 3 is a flowchart which illustrates the process for monitoring HealthMonitor policy P on a separate thread T. The process begins by checking the data item(s) specified for this policy at step 3000. An inquiry is then made (Diamond 3002) to check if P monitors for a long-term trend. If the answer to inquiry 3002 is Yes, and P does monitor for a long-term trend, the current data point is added to the saved trend data at step 3004 and the process continues to step 3006. If the answer to inquiry 3002 is No, and P does not monitor for a long-term trend, the process continues to make another inquiry at step 3006.

Inquiry 3006 checks to see if P is violated. If the answer to inquiry 3006 is No, and P is not violated, the process continues at inquiry 3016 to check if the service is stopping. If the answer to inquiry 3016 is Yes, and the service is indeed stopping, then T terminates itself and the process exits at step 3018. If the answer to inquiry 3016 is No, and the HealthMonitor service is not stopping, a process to wait for the "time interval" specified for this policy is initiated (Block 3020). The process then loops back to step 3000 to check the specified policy, and continues to go through the process again.

If the answer to inquiry 3006 is Yes, and P has been violated, a violation event is created and added to RealthEvents collection (Block 3008). For example, the policy that monitors CPU utilization will be violated if CPU usage exceeds 90% for a reasonable period of time; in this case, a violation event is added to the collection for this CPU usage violation.

An inquiry is then made to check if P monitors predictive data (Diamond 3010). If the answer to inquiry 3010 is No, and P does not monitor predictive data, the action specified for that policy, if any, is taken at step 3014. If the answer to inquiry 3010 is Yes, and P does monitor predictive data, the violation event is added to the PredictiveEvents collection (Block 3012). Next, the action specified for this policy, if any, is taken (Block 3014). For example, a policy that monitors the status of a critical system service may respond to finding the service not running by attempting to restart it. An inquiry is then made at step 3016 to check if the HealthMonitor service is stopping. If the answer to inquiry 3016 is Yes, and the service is indeed stopping, the thread T terminates itself and the process exits at step 3018. If the answer to inquiry 3016 is No, and the service is not stopping, a process to wait for the time interval specified for this policy is initiated (Block 3020). The process then loops back to step 3000 to check the specified policy, and continues to go through the process again.

Figure 4:
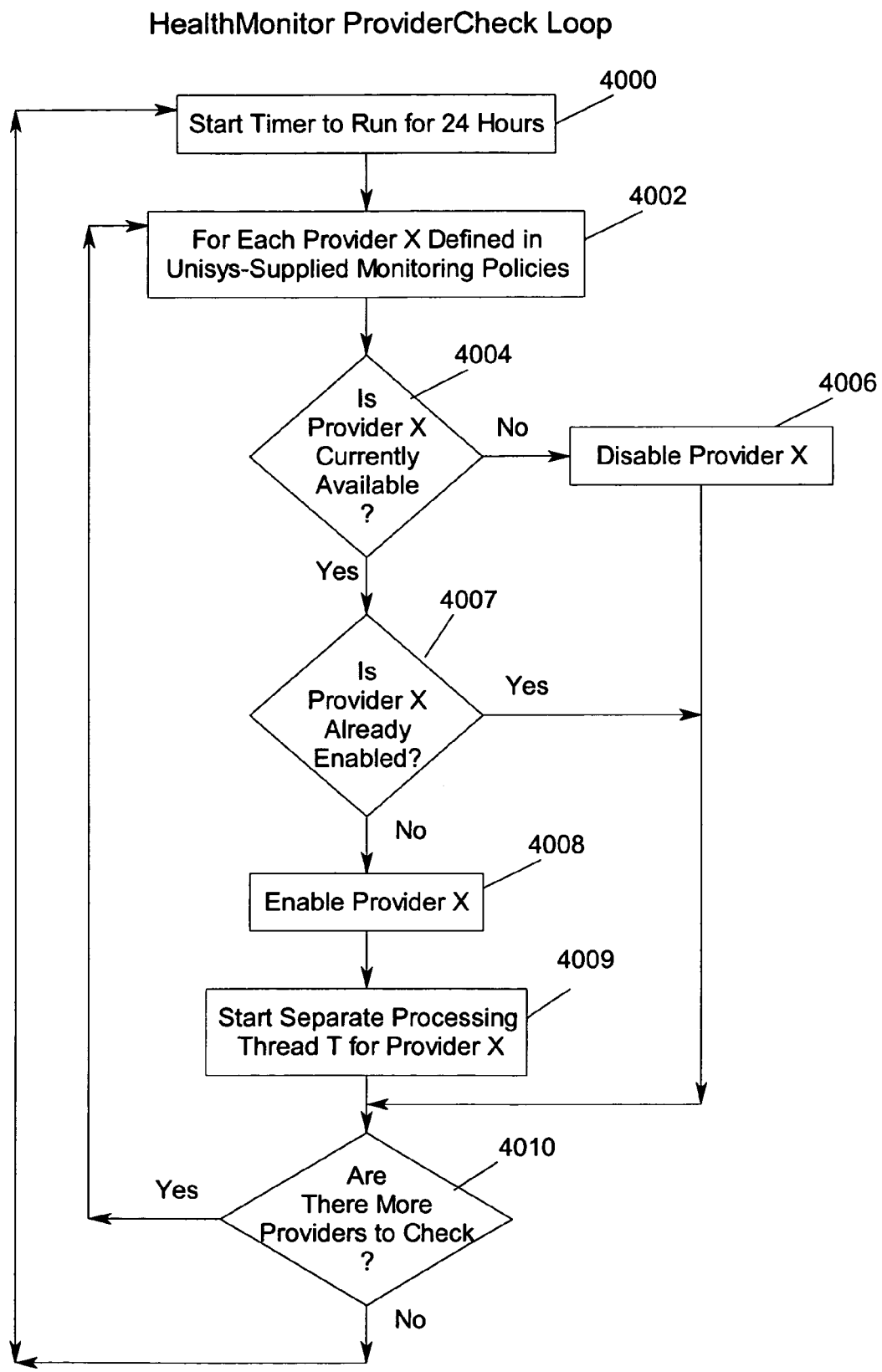
FIG. 4 illustrates a process that checks for HealthMonitor data providers.

FIG. 4 is a flowchart that illustrates the process of the HealthMonitor ProviderCheck loop. First, a timer is started to run for 24 hours (Block 4000), and then for each provider X (Glossary #36) defined in the Unisys-supplied monitoring policies (Block 4002), an inquiry is made (Diamond 4004). Inquiry 4004 checks to see if provider X is currently available. If the provider X is not available (No), Provider X is disabled (Block 4006), and the process continues at Inquiry 4010. If provider X is available (Yes), then another inquiry is made at step 4007 to check if provider X is already enabled. If provider X is already enabled, then the process continues at Inquiry 4010. If the answer to inquiry 4007 is No, and provider X is not already enabled, provider X will be enabled at step 4008. Separate processing is started for Thread T for provider X at step 4009. Inquiry 4010 then checks if provider X is the last provider defined in the monitoring policies. If there are no more providers to check, then the timer is set to start for 24 hours again at step 4000, and the process continues; otherwise the process returns to Block 4002 to check for the next provider. The loop described by the steps in FIG. 4 allows the HealthMonitor service to detect changes in provider availability so that only those monitoring policies whose providers are enabled will be run. If a provider is added after the HealthMonitor service starts, the policies for that provider will become active the next time this loop executes; likewise, policies that have been rendered inapplicable because their provider has become unavailable will be disabled at the next loop. The loop does not terminate until the HealthMonitor service is terminated.

Figure 5:
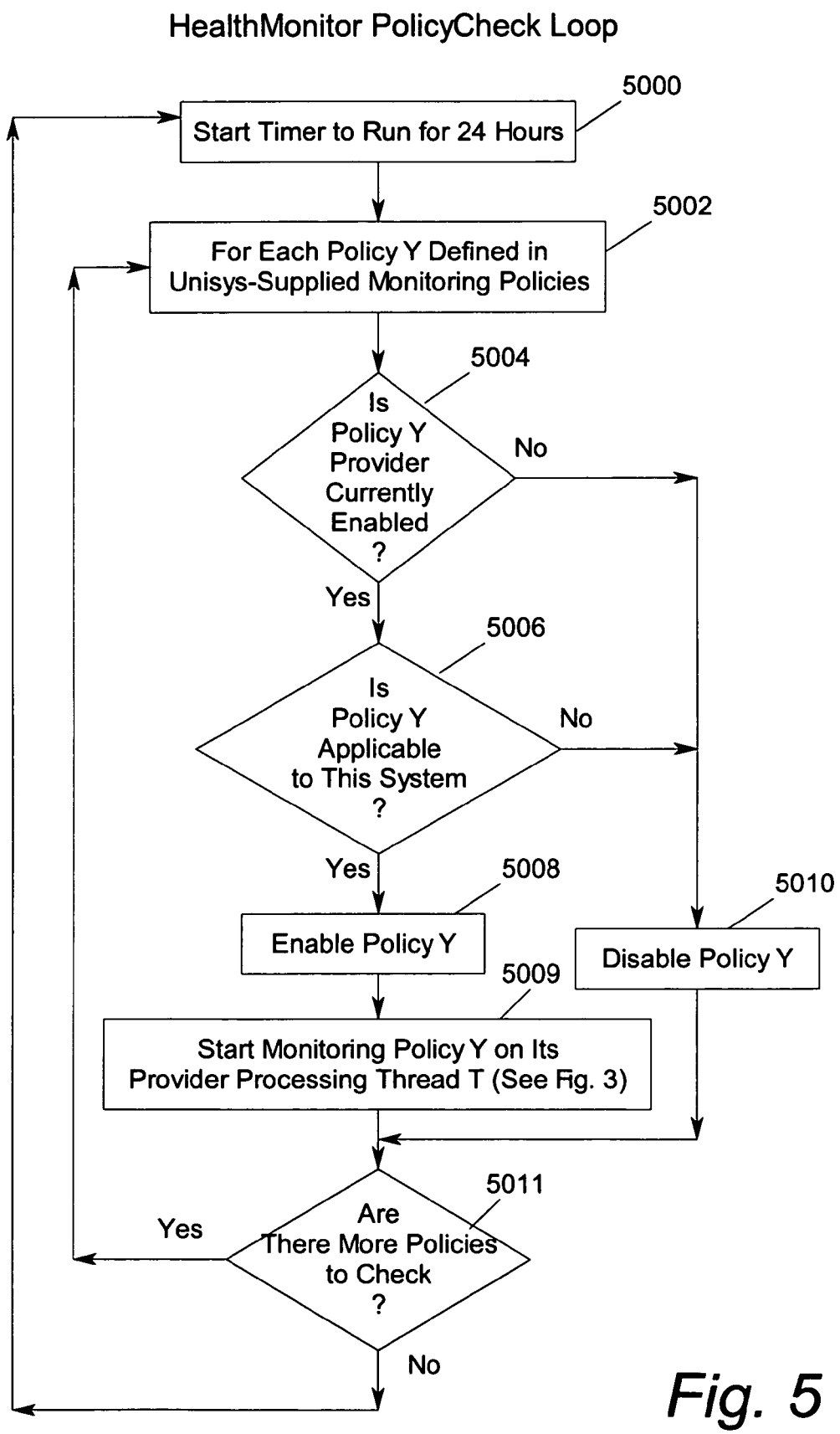
FIG. 5 illustrates a process that checks the policies of the HealthMonitor.

FIG. 5 illustrates the HealthMonitor PolicyCheck loop. First, the timer is set to start and run for 24 hours at step 5000. Next, for each policy Y defined in the Unisys-supplied monitoring policies (Block 5002), a set of steps is initiated. An inquiry is made at step 5004 to check if the policy Y provider is currently enabled. If the answer to inquiry 5004 is No, and the policy Y provider is not enabled, policy Y is disabled at step 5010, and then the process continues at Inquiry 5011.

If the answer to inquiry 5004 is Yes, and the provider is currently enabled, then another inquiry is made at step 5006. Inquiry 5006 checks to see if the policy Y is applicable to the local system where the HealthMonitor service is running. If the answer to inquiry 5006 is No, policy Y is disabled, and the process continues at step 5011. If the answer to inquiry 5006 is Yes, policy Y is enabled at step 5008, and a process to start monitoring policy Y on its provider-processing Thread T is initiated at step 5009. Step 5009 is described in further detail in FIG. 3. Inquiry 5011 then checks if policy Y is the last policy defined in the monitoring policies. If there are no more policies to check, then the process continues back to step 5000 to start the timer to run for 24 hours; otherwise the process returns to Block 5002 to check the next policy. The loop described by the steps in FIG. 5 allows the HealthMonitor service to detect changes in the system configuration so that only those policies that monitor an element present on the system will be run. If additional hardware or software is installed after the HealthMonitor service starts, any policies that monitor the new hardware or software will become active the next time this loop executes; likewise, policies that have been rendered inapplicable, because the items they monitor have been uninstalled, will be disabled at the next loop. The loop does not terminate until the HealthMonitor service is terminated.

Figure 6:
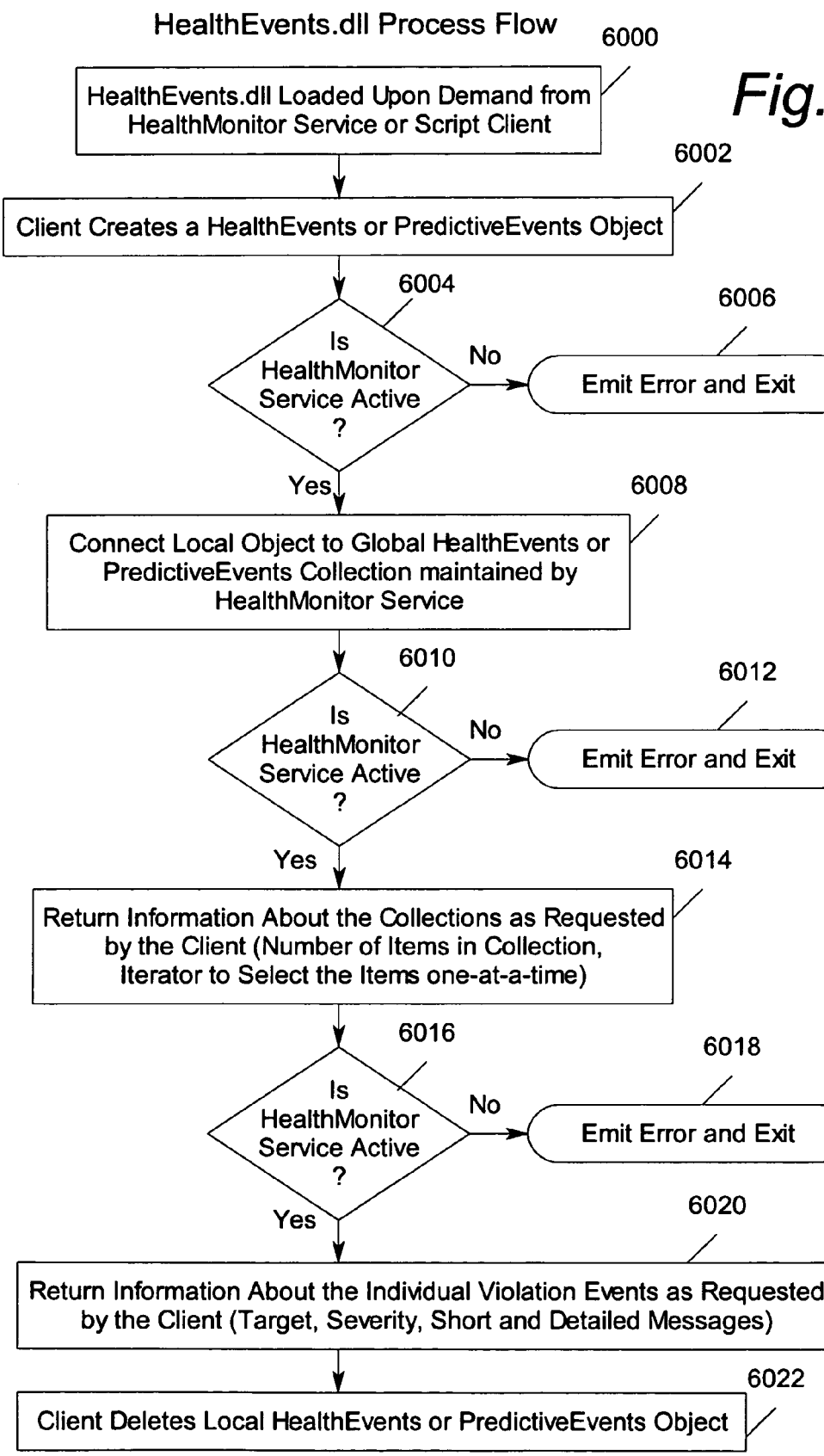
FIG. 6 is a flowchart that illustrates the process flow for the HealthEvent.dll file.

FIG. 6 is a flowchart that illustrates the HealthEvents.dll process flow. First, the HealthEvents.dll (dynamic link library) is load d upon demand from the HealthMonitor Service or a script client at step 6000. The client then creates a HealthEvents or PredictiveEvents object (Block 6002). An inquiry is then made at step 6004 to check if the HealthMonitor service is active. If the answer to inquiry 6004 is No, and the HealthMonitor service is not active, an error is emitted and the process exits at step 6006.

If the answer to inquiry 6004 is Yes, and the HealthMonitor service is indeed active, a process is initiated to connect the client's local object HealthEvents or PredictiveEvents object to the global RealthEvents or PredictiveEvents collection maintained by the HealthMonitor Service (Block 6008). Next, another inquiry is made (Diamond 6010) to check again if the HealthMonitor service is active. If the answer to inquiry 6010 is No, and the HealthMonitor service is not active, an error is emitted and the process exits at step 6012. If the answer to inquiry 6010 is Yes, and the HealthMonitor service is indeed active, a process is initiated to return information about the collections as requested by the client (number of items in collection, iterator to select the items one at a time) at step 6014. Once again, another inquiry to check if HealthMonitor service is active is initiated at step 6016. If the answer to inquiry 6016 is No, and the HealthMonitor service is not active, an error is emitted and the process exits at step 6018. If the answer to inquiry 6016 is Yes, and the HealthMonitor service is indeed active, a process is initiated to return information about the individual violation events as requested by the client at step 6020. The information that can be retrieved includes these verity of the violation (error, warning, information), the target icon to flash in the Server Director tree view if applicable, and a short headline and longer detailed message describing the violation. For instance, a CPU usage violation event would have a severity of "error", a target of "CPU <x>" (where <x> is the number of the affected CPU), a short message of "Utilization for Processor <x>", and a detailed message of "Processor usage for CPU <x> exceeds threshold of 90%, current value is <y>%" (where <y> will be greater than 90). The client then deletes the local HealthEvents or PredictiveEvents object at step 6022.

Described herein has been a monitoring method for a multiprocessor system which provides an exemplary service to, for example, the .NET environment. This service can detect any violation of Policy-set conditions and can use scripts to provide corrective measures. This service operates to automatically start a "health-monitoring policy", operate to monitor conditions in the system configuration, and to provide system health trend analysis.

Though one embodiment of the invention has been illustrated, other embodiments may be implemented which still utilize the essence of the invention as defined in the attached claims.

What is claimed is:

1. In a network where multiple servers operate as a set of local systems each local system connected to a Windows™ .NET operating system utilizing a computer program and operated by Client-Users, a method for monitoring the health of and for providing remedial actions to said monitored local systems comprising the steps of:
- (a) monitoring the state of hardware and software in each of said local systems over a selected time period;
- (b) collecting Health Events data in a Health Events Object with a Collection file for each local system including the steps:
- (b1) establishing Health Events parameters which set standards of acceptability and non-acceptability for each local system including the steps of:
- (b1a) establishing trend setting predictive means to sense when an event is trending toward a direction of failure;
- (b1b) notifying said Client-User of impending failure events;
- (b2) sensing each local system for operations which violate said parameters of acceptability;
- (c) enabling applications/scripts for handling system health conditions deemed outside of pre-set parameters reported in a Health Events Object;
- (d) utilizing a .NET platform working with a Server operating as a local system and subject to a Health Monitor Services program;
- (e) enabling a Server Director program to access Health Events and Predictive Events objects in a said Collection file, including:
- (e1) establishing a pre-set Policy P for each local system;
- (e2) collecting violations of each said Policy P;
- (e3) enabling scripts to handle each noted violation of said Policy P;
- (f) applying an application/script program to institute corrective action for selected events in said Collection file.

* * * * *